United States Patent [19]

Post

[11] Patent Number: 5,366,084
[45] Date of Patent: Nov. 22, 1994

[54] CONTAINERS POSITIONABLE OVER OIL FILTERS OF MOTORS FOR PRECLUDING THE SPILLAGE OF OIL

[76] Inventor: George Post, 319 Paseo Venado, Rio Rico, Ariz. 85648

[21] Appl. No.: 215,100
[22] Filed: Mar. 21, 1994
[51] Int. Cl.⁵ .......................................... B65D 85/00
[52] U.S. Cl. .................................. 206/319; 220/737; 210/248; 206/204
[58] Field of Search .............. 206/204, 319, 335, 527, 206/524.4; 220/731, 733, 737; 210/238, 248, 168

[56] References Cited
U.S. PATENT DOCUMENTS

| | | | |
|---|---|---|---|
| 4,376,703 | 3/1983 | Krauss | 220/737 X |
| 4,451,368 | 5/1984 | Pandelena et al. | 210/248 X |
| 4,642,183 | 2/1987 | Hebest | 210/248 X |
| 4,865,727 | 9/1989 | Krauss | 210/238 X |
| 4,877,155 | 10/1989 | Tull | 210/248 X |
| 4,913,813 | 4/1990 | Covarrubias et al. | 210/238 X |

Primary Examiner—Jacob K. Ackun, Jr.
Attorney, Agent, or Firm—Michael J. Colitz, Jr.

[57] ABSTRACT

A new and improved container positionable over oil filters of motor for precluding the spillage of oil comprising of sidewalls in a cylindrical configuration over the majority of their extent, the sidewalls forming free lower ends and free upper ends, the upper ends being formed with an outwardly flare in a cone-like configuration, the sidewalls being fabricated of an absorbent cardboard-like material. A cap formed with a lower generally planar base and upstanding cylindrical walls, the cylindrical walls including an upper interior surface of a size to receive the lower ends of the sidewalls, the lower exterior surface being formed with axially extending flutes.

4 Claims, 3 Drawing Sheets

CONTAINERS POSITIONABLE OVER OIL FILTERS OF MOTORS FOR PRECLUDING THE SPILLAGE OF OIL

BACKGROUND OF THE INVENTION

1. Field of the Invention

The present invention relates to containers positionable over oil filters of motors for precluding the spillage of oil and more particularly pertains to precluding the spilling of oil from adjacent a motor while changing an oil filter.

2. Description of the Prior Art

The use of containers for used oil is known in the prior art. More specifically, containers for used oil heretofore devised and utilized for the purpose of receiving oil from the filters or other areas are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 5,121,776 to Kovach an oil drain bag.

U.S. Pat. No. 4,948,503 to Baumann et al. discloses an oil filter cover in combination with an oil filter cartridge.

U.S. Pat. No. 4,756,349 to Atkins discloses a quick connect/disconnect oil draining apparatus.

U.S. Pat. No. 4,376,703 to Krauss discloses an oil filter cover.

U.S. Pat. No. 3,874,478 to Mantell, Jr. discloses a crankcase drain valve with attachment for disposable oil bags.

In this respect, the containers positionable over oil filters of motors for precluding the spillage of oil according to the present invention substantially departs from the conventional concepts and designs of the prior art, and in doing so provides an apparatus primarily developed for the purpose of to preclude the spilling from adjacent a motor while changing.

Therefore, it can be appreciated that there exists a continuing need for new and improved containers positionable over oil filters of motors for precluding the spillage of oil which can be used for precluding the spilling of oil from adjacent to a motor while changing an oil filter. In this regard, the present invention substantially fulfills this need.

SUMMARY OF THE INVENTION

In view of the foregoing disadvantages inherent in the known types of containers for used oil now present in the prior art, the present invention provides an improved containers positionable over oil filters of motors for precluding the spillage of oil. As such, the general purpose of the present invention, which will be described subsequently in greater detail, is to provide a new and improved containers positionable over oil filters of motors for precluding the spillage of oil and method which has all the advantages of the prior art and none of the disadvantages.

To attain this, the present invention essentially comprises a new and improved container positionable over oil filters of motor for precluding the spillage of oil comprising of sidewalls in a cylindrical configuration over the majority of their extent, the sidewalls forming free lower ends and free upper ends, the upper ends being formed with an outwardly flare in a cone-like configuration, the sidewalls being fabricated of an absorbent cardboard-like material. A cap formed with a lower generally planar base and upstanding cylindrical walls, the cylindrical walls including an upper interior surface of a size to receive the lower ends of the sidewalls, the lower exterior surface being formed with axially extending flutes. The flutes extending from the exterior surface to the interior surface and adapted to mate with flutes on the lower exterior surface of an oil filter to be removed. An adhesive coupled to the exterior lower surface of the sidewalls and the interior upper surface of the cap.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved containers positionable over oil filters of motors for precluding the spillage of oil which have all the advantages of the prior art containers for used oil and none of the disadvantages.

It is another object of the present invention to provide new and improved containers positionable over oil filters of motors for precluding the spillage of oil which may be easily and efficiently manufactured and marketed.

It is further object of the present invention to provide new and improved containers positionable over oil filters of motors for precluding the spillage of oil which are of durable and reliable constructions.

An even further object of the present invention is to provide new and improved containers positionable over oil filters of motors for precluding the spillage of oil which are susceptible of a low cost of manufacture with regard to both materials and labor, and which accordingly are then susceptible of low prices of sale to the consuming public, thereby making such containers positionable over oil filters of motors for precluding the spillage of oil economically available to the buying public.

Still yet another object of the present invention is to provide new and improved containers positionable over oil filters of motors for precluding the spillage of oil which provide in the apparatuses and methods of the prior art some of the advantages thereof, while simultaneously overcoming some of the disadvantages normally associated therewith.

Still another object of the present invention is to preclude the spilling of oil while changing an oil filter from adjacent a motor while changing an oil filter.

Lastly, it is an object of the present invention to provide new and improved container positionable over oil filters of motor for precluding the spillage of oil comprising of sidewalls in a cylindrical configuration over the majority of their extent, the sidewalls forming free lower ends and free upper ends, the upper ends being formed with an outwardly flare in a cone-like configuration, the sidewalls being fabricated of an absorbent cardboard-like material. A cap formed with a lower generally planar base and upstanding cylindrical walls, the cylindrical walls including an upper interior surface of a size to receive the lower ends of the sidewalls, the lower exterior surface being formed with axially extending flutes.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
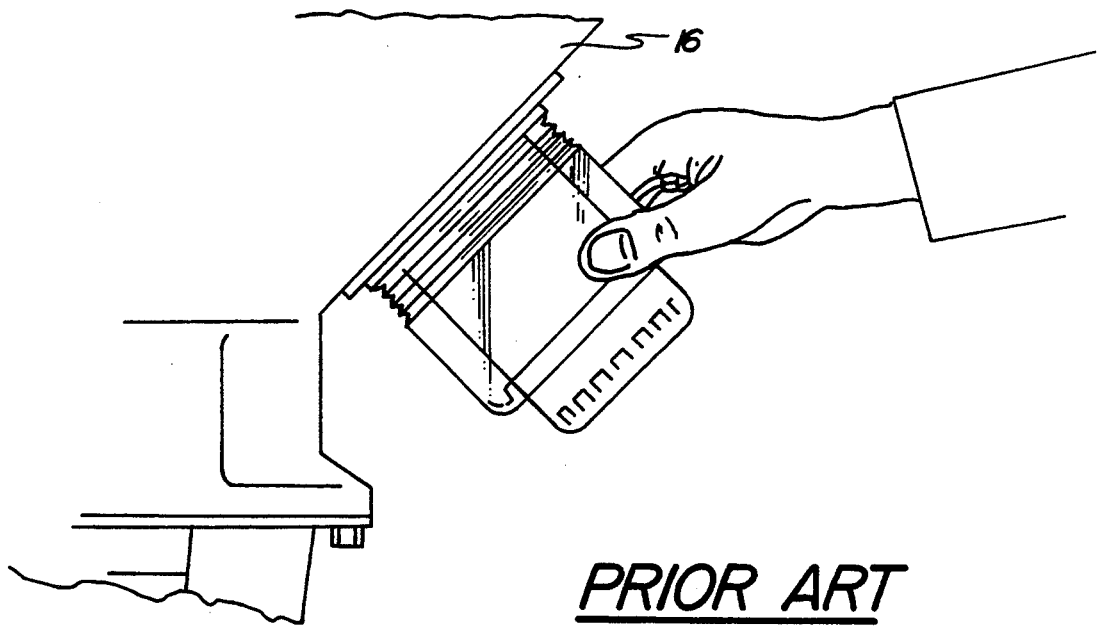
FIG. 1 is a perspective illustration of a prior art container for receiving
Figure 2:
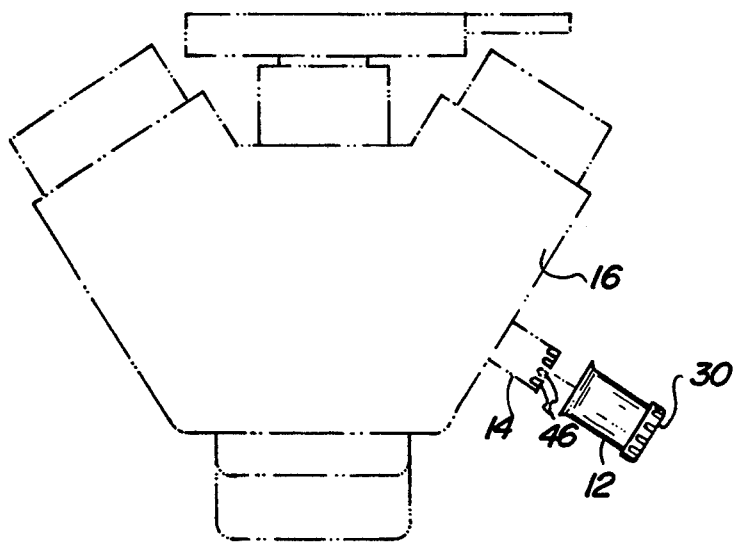
FIG. 2 is a front elevational view of the preferred embodiment of the new and improved containers positionable over oil filters of motors for precluding the spillage of oil constructed with the principals of the present invention.
Figure 3:
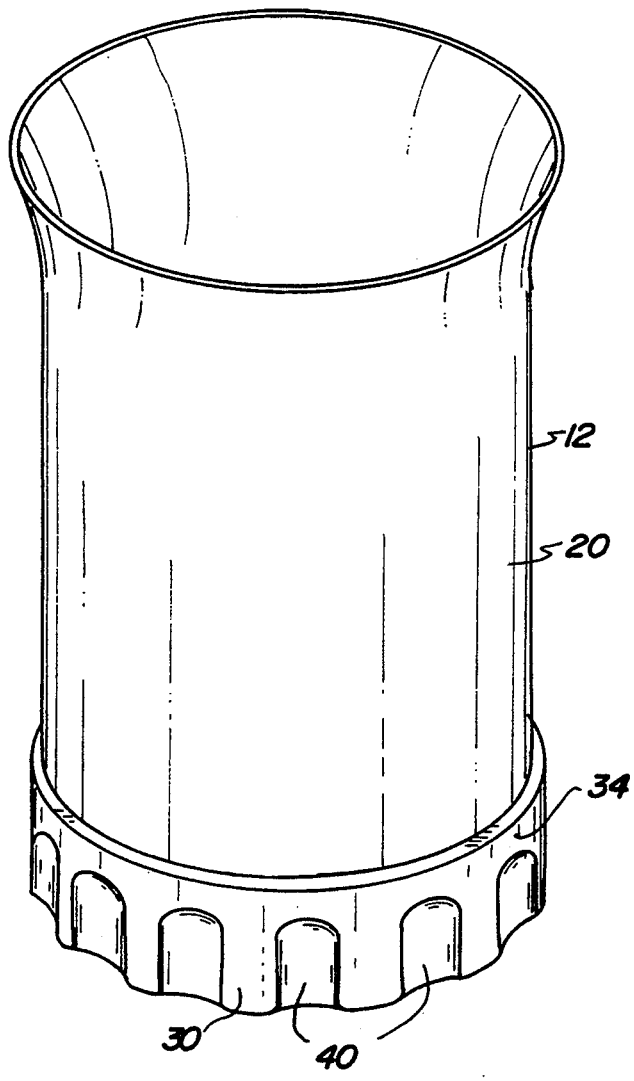
FIG. 3 is a perspective view of the container illustrated in FIG. 2.
Figure 4:
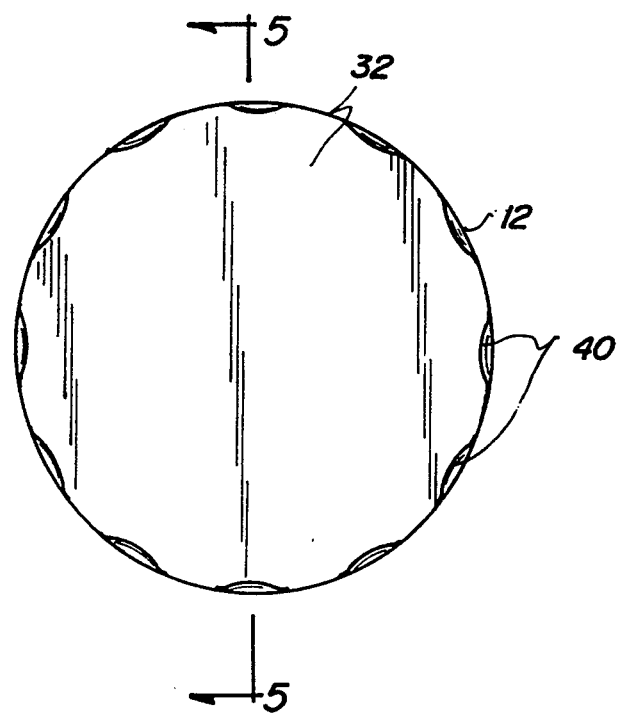
FIG. 4 is a bottom view of the container illustration in FIGS. 2 and 3.
Figure 5:
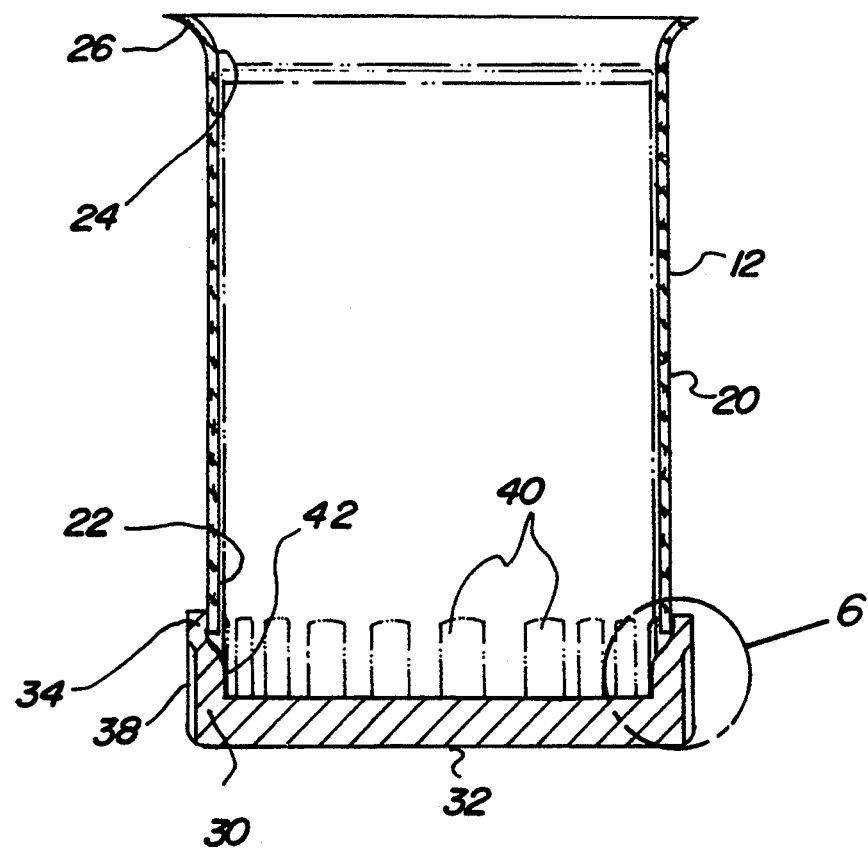
FIG. 5 is a cross-sectional view taken along lines 5—5 of FIG. 4.
Figure 6:
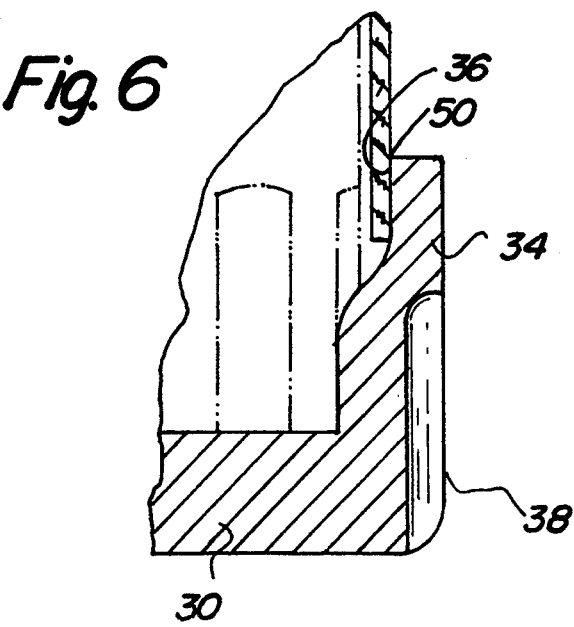
FIG. 6 is an enlarged cross-sectional view of a lower corner of the device of the prior Figures taken along circle 6 of FIG. 5.

With reference now to the drawings, and in particular to FIG. 1 thereof, the preferred embodiment of the new and improved containers positionable over oil filters of motors for precluding the spillage of oil embodying the principles and concepts of the present invention and generally designated by the reference numeral 10 will be described.

The present invention, the new and improved containers positionable over oil filters of motors for precluding the spillage of oil is comprised of a plurality of individual components. The components include, in their broadest context, sidewalls, a cap, flutes and an adhesive. Such components are individually configured and correlated one with respect to the other to obtain desired objective.

The invention is for using the containers 12 so as to be positionable over an oil filter 14 of a motor 16. The container includes sidewalls 20 as a major component of the invention. The sidewalls are in a cylindrical configuration over the majority of their extents. The sidewalls form free lower ends 22 and free upper ends 24. The upper ends are formed with an outward flare 26 to an increased diameter as compared with the majority of the central extent of the sidewalls. The flare 26 thus achieves a cone-like configuration. The sidewalls are preferably fabricated of an oil absorbent material such as cardboard or other cardboard-like material.

The next major component of the system is a cap 30. The cap is formed with a generally lower planar base 32. It has upstanding cylindrical walls 34. The cylindrical walls include an upper interior surface 36. Such upper interior surface is of a size to receive the lower ends of the sidewalls 20. The lower exterior surface 38 of the cap 30 is formed with axially extending flutes 40, indentations parallel with the axis of the sidewalls and cylindrical walls.

The flutes 40 extend from the exterior surface 38 of the cap to the interior surface 42. The flutes are adapted to mate with the flutes 46 on the lower exterior surface of an oil filter 14 to be removed. In this manner, when the container is positioned over an oil filter to be removed, and the cap is squeezed to provide a gripping pressure from the cap to the filter, the flutes 38 of the cap will mesh with the flutes 46 of the filter to effect a positive coupling therebetween to further facilitate the rotational movement of the filter to effect its removal.

The last component of the container is an adhesive 50. Such adhesive is located between the lower exterior surface of the cylindrical walls 34 and the upper internal surfaces of the cap. In this manner, the cap and sidewalls form an integral system for use to achieve the intended objectives.

Using the containers of the present invention functions to preclude the spillage of oil. In using such containers, the steps include:

1. Loosen the old engine oil filter with oil-filter wrench.
2. Slip the container of the present invention over the old oil filter and push up against the engine block. Turn the filter and container to unscrew filter. The oil from the filter housing and top of the filter spills into the new container and not on hands or on any automobile structural members.
3. Carefully remove the container.
4. Dispose of the entrapped used oil and container in an environmentally acceptable manner.

The containers positionable over oil filters of motors for precluding the spillage of oil reduces the mess associated with oil changes. When a filter is removed, it usually leaks oil which drips onto the user's hands, the automobile, and the floor. This spill is extremely messy and difficult to clean up. The solution to this problem is to use a container positionable over oil filters of motors for precluding the spillage of oil. It enables a mechanic to remove a filter and confine the oil to an enclosed area.

This invention is constructed from plastic or stiff paper, and has a shape similar to a cup. The top portion of the filter is made from a semi-rigid material, while the base is stiff and rigid. The base has grooves or flutes around its circumference. These grooves help to grip the base of the filter.

To remove an oil filter, simply loosen it in the conventional manner, either by hand or with a filter wrench, and then place the container positionable over oil filters of motors for precluding the spillage of oil over it. Then, as the filter is rotated, any oil that leaks out is collected in the bottom of the pocket. Both the filter and the container positionable over oil filters of motors for precluding the spillage of oil are then disposed of in a suitable manner.

This product is ideal for use by a do-it yourselfer as well as a commercial mechanic. It is easy to use and will save money in cleanup time. Anyone who changes oil would be wise to use it. As each vehicle has its oil filter changed several times a year on average, containers positionable over oil filters of motors for precluding the spillage of oil has much potential.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved container positionable over oil filters of motor for precluding the spillage of oil comprising:

sidewalls in a cylindrical configuration over the majority of their extent, the sidewalls forming free lower ends and free upper ends, the upper ends being formed with an outwardly flare in a cone-like configuration, the sidewalls being fabricated of an absorbent cardboard-like material;

a cap formed with a lower generally planar base and upstanding cylindrical walls, the cylindrical walls including an upper interior surface of a size to receive the lower ends of the sidewalls, a lower exterior surface of said cap being formed with axially extending flutes;

the flutes extending from the exterior surface to the interior surface and adapted to mate with flutes on the lower exterior surface of an oil filter to be removed; and an adhesive coupled to the exterior lower surface of the sidewalls and the interior upper surface of the cap.

2. A new and improved container positionable over oil filters of motor for precluding the spillage of oil comprising:

sidewalls in a cylindrical configuration over the majority of their extent, the sidewalls forming free lower ends and free upper ends, the upper ends being formed with an outwardly flare in a cone-like configuration, the sidewalls being fabricated of an absorbent cardboard-like material;

a cap formed with a lower generally planar base and upstanding cylindrical walls, the cylindrical walls including an upper interior surface of a size to receive the lower ends of the sidewalls, a lower exterior surface of said cap being formed with axially extending flutes.

3. The container as set forth in claim 2 wherein said flutes extend from the exterior surface to the interior surface and are adapted to mate with flutes on the lower exterior surface of an oil filter to be removed.

4. The container as set forth in claim 2 and further including:

an adhesive coupled to the exterior lower surface of the sidewalls and the interior upper surface of the cap.

* * * * *